US009985886B2

(12) United States Patent
Brandeburg et al.

(10) Patent No.: US 9,985,886 B2
(45) Date of Patent: May 29, 2018

(54) TECHNOLOGIES FOR NETWORK PACKET PACING DURING SEGMENTATION OPERATIONS

(71) Applicant: Intel Corporation, Santa Clara, CA (US)

(72) Inventors: Jesse C. Brandeburg, Portland, OR (US); Scott P. Dubal, Beaverton, OR (US); Patrick Connor, Beaverton, OR (US); David E. Cohen, Hull, MA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 14/671,776

(22) Filed: Mar. 27, 2015

(65) Prior Publication Data
US 2016/0285767 A1 Sep. 29, 2016

(51) Int. Cl.
*H04L 12/801* (2013.01)
*H04L 12/26* (2006.01)
*H04L 12/805* (2013.01)

(52) U.S. Cl.
CPC .......... *H04L 47/12* (2013.01); *H04L 43/0864* (2013.01); *H04L 47/36* (2013.01)

(58) Field of Classification Search
CPC ...... H04L 47/12; H04L 43/0864; H04L 47/36
See application file for complete search history.

(56) References Cited

U.S. PATENT DOCUMENTS

| | | | | |
|---|---|---|---|---|
| 6,115,357 A * | 9/2000 | Packer | ..................... | H04L 47/10 370/231 |
| 7,668,091 B2 * | 2/2010 | Hoshi | ..................... | H04L 29/06 370/230.1 |
| 2006/0146747 A1 * | 7/2006 | Shpak | ................... | H04W 88/08 370/328 |
| 2006/0206579 A1 * | 9/2006 | Connor | ............... | H04L 12/5693 709/214 |
| 2007/0174511 A1 | 7/2007 | Yu | | |
| 2009/0097442 A1 * | 4/2009 | Diab | ................. | H04L 12/40136 370/329 |
| 2012/0106535 A1 * | 5/2012 | Horiguchi | ......... | H04W 52/0222 370/345 |
| 2013/0279338 A1 | 10/2013 | Mehrotra et al. | | |

(Continued)

FOREIGN PATENT DOCUMENTS

WO 2015-014833 2/2015

OTHER PUBLICATIONS

International Search Report for PCT/US16/019802, dated Jun. 8, 2016 (3 pages).

(Continued)

*Primary Examiner* — Benjamin H Elliott, IV
*Assistant Examiner* — Kevin Lee
(74) *Attorney, Agent, or Firm* — Barnes & Thornburg LLP

(57) ABSTRACT

Technologies for pacing transmission of network packets by a computing device to a remote computing device include performing a segmentation offload operation to segment a payload of a network packet into a plurality of network packet segments in response to a determination that a size of the payload is greater than a maximum allowable payload size. The computing device additionally determines a packet pacing interval and transmits the plurality of network packet segments to the remote computing device at a transmission rate based on the packet pacing interval.

27 Claims, 6 Drawing Sheets

(56) References Cited

U.S. PATENT DOCUMENTS

| | | | | |
|---|---|---|---|---|
| 2014/0079170 A1* | 3/2014 | Le Houerou | ......... | H04L 7/0016 |
| | | | | 375/371 |
| 2014/0334819 A1* | 11/2014 | Mehrvar | ............ | H04Q 11/0003 |
| | | | | 398/51 |
| 2014/0369355 A1* | 12/2014 | Hori | ........................ | H04L 69/14 |
| | | | | 370/392 |
| 2015/0009999 A1* | 1/2015 | Oguchi | ................ | H04L 69/169 |
| | | | | 370/392 |

OTHER PUBLICATIONS

Written Opinion for PCT/US116/019802, dated Jun. 8, 2016 (9 pages).
Zubin Dittia, Integrated Hardware/Software Design of a High Performance Network Interface, Server Institute of Technology Washington University, May 2001. pp. 15, 16, 17, 45, 49, 53, 93, 102, and 103.

* cited by examiner

TECHNOLOGIES FOR NETWORK PACKET PACING DURING SEGMENTATION OPERATIONS

BACKGROUND

Modern computing devices have become ubiquitous tools for personal, business, and social uses. As such, many modern computing devices are capable of connecting to various data networks, including the Internet and corporate intranets, to retrieve and transmit/receive data communications over such networks at varying rates of speed. To facilitate communications between computing devices, networks typically include one or more network devices (e.g., network switches, network routers, servers, other compute and/or store computing devices, etc.) to route communications (i.e., network packets) from a source computing device to a destination computing device. As the network packets are transmitted from the source computing device, processed by network devices according to its network flow, and received by the destination computing device, the network packets may be transmitted in bursts at rates higher than can be supported by each of the network devices and/or the destination computing device. Such network traffic bursts may cause congestion at various points (i.e., network devices, destination computing device, etc.) across the network, which may result in a reduced overall network efficiency caused by network packet queueing delays, network packet loss, and decreased throughput, for example.

Various methods have been introduced to reduce the congestion attributable to the bursty network traffic, including packet pacing. Packet pacing is a technology in which the transmission of network packets is evenly spaced over a duration corresponding to the round-trip-time (RTT). Some packet pacing methods involve the source computing device transmitting the network packets at a rate defined by the source computing device, thereby spreading out the transmission of the network packets, as opposed to transmitting the packets in a single burst. To determine the rate, network stacks regularly monitor end-to-end latency, bandwidth, and rate loss, which may be compensated for by adjusting packet size. However, certain offload operations, such as segmentation operations offloaded to hardware to control throughput (i.e., the amount of data to transmit with each transmission), generally do not have a means by which to incorporate such information from the stack when transmitting the packets on the wire. As such, the aforementioned compensation may be lost when undergoing such operations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
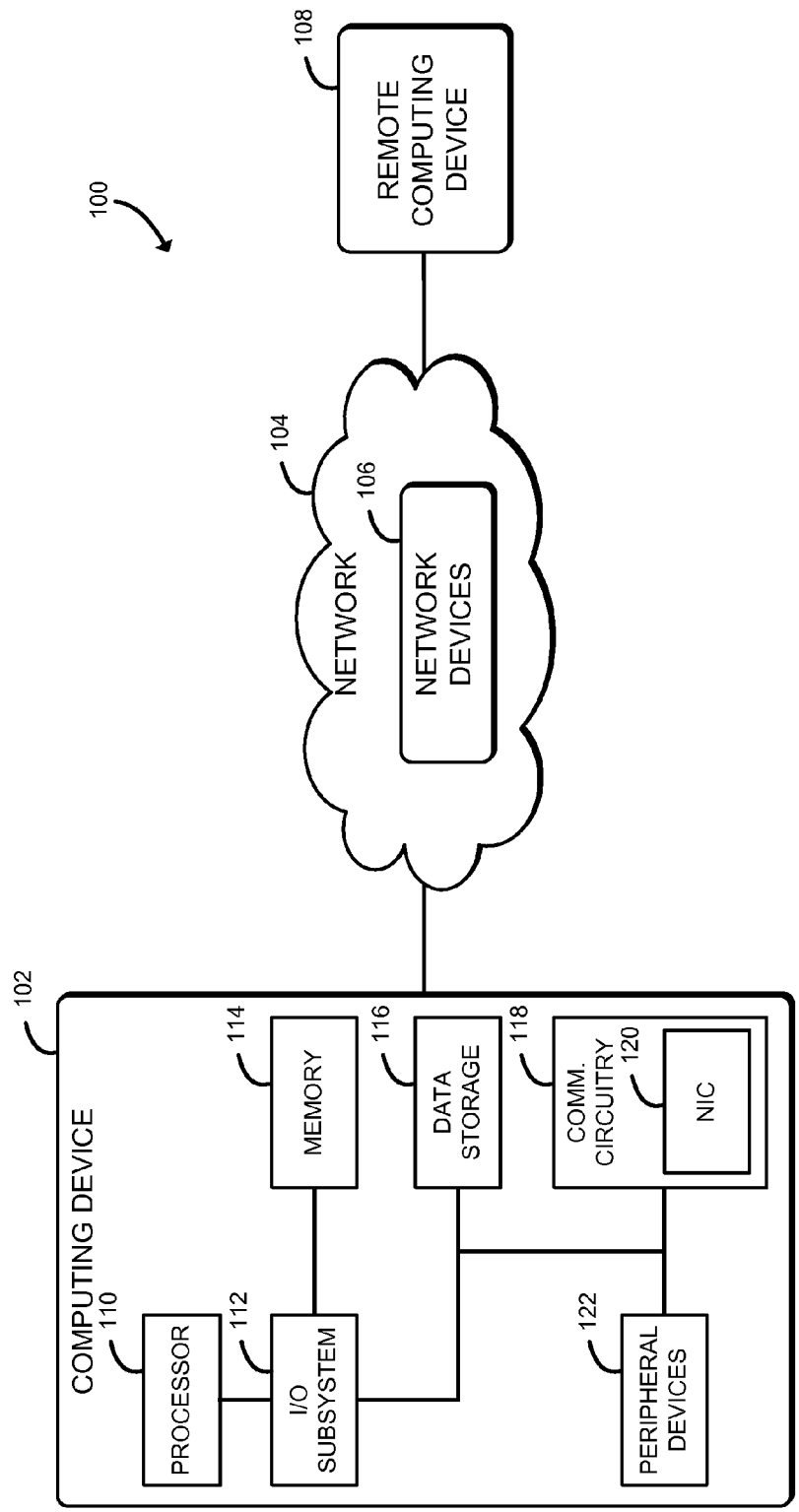
FIG. 1 is a simplified block diagram of at least one embodiment of a system for pacing hardware offload segmented network packet transmissions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for pacing the transmission of network communications includes a computing device 102 and a remote computing device 108 in communication over a network 104 via one or more network devices 106. The network devices 106 facilitate network communications (i.e., network packets) between the computing device 102 and the remote computing device 108 over the network 104. For example, the remote computing device 108 may request data from the computing device 102 by sending a network packet that includes the request. Of course, it should be appreciated that the request may be sent via more than one network packet. In response to the request, the computing device 102 may attempt to transmit data (i.e., a payload) via one or more network packets to the remote computing device 108 across the network 104. In some embodiments, the computing device 102 may generate a network packet including all the data in the response, which may result in the network packet having a payload larger than a maximum segment size (i.e., maximum transmission segment size) supported by the remote computing device 108. In such embodiments, the computing device 102 may partition the large payload into segments that meet the maximum segment size requirements.

Typically, a processor of the computing device 102 segments the payload; however, segmenting a large payload can be processor intensive (i.e., increased processor overhead), which may lead to inefficiencies in network traffic processing and/or other computing device 102 managed processes. Accordingly, the processor of the computing device 102 may be enabled to offload the segmentation (i.e., a transmission segmentation offload (TSO)) to hardware, such as a network interface controller (NIC) of the computing device 102. As a result of the hardware offload segmentation, the original payload of the original network packet may be broken down into segments (i.e., segmented network packets with smaller payload) without stressing the processor. However, such hardware offloading may result in network packets being sent to remote computing devices 108 in bursts (i.e., a series of network packets with minimal inter-packet delays in transmission). Such bursty network traffic may be difficult for the remote computing devices 108 on the receiving end to process and may result in an overrun, a decrease in bandwidth throughput, and/or an increase in processor overhead of one or more of the network devices 106 and/or the remote computing device 108.

Unlike conventional methods, wherein a network stack performs the pacing using packet encapsulation, the NIC performs the segmentation and pacing transmission of the segments based on a transmission rate interval. In use, as described in further detail below, the transmission rate interval may be introduced into the TSO to control the rate of transmission of the network packets on a per-flow basis. In some embodiments, the transmission rate interval may be passed to the hardware performing the TSO as an instruction with the data to be segmented. In some embodiments, the transmission rate interval may comprise a minimum time gap between segmented network packets, or a percentage of the maximum transmission rate, that indicates to the hardware performing the TSO that the hardware is transmission rate limited for that particular set of segmented packets. Such pacing may result in an interleaved mix of network packets to different destinations being present in a packet train, which may allow more time for a receiving computing device, such as the network devices 106 and/or the remote computing devices, to process a received network packet prior to receiving the next network packet (i.e., reducing congestion) due to the larger inter-packet gaps between transmitted network packets.

The network 104 may be embodied as any type of wired or wireless communication network, including cellular networks (e.g., Global System for Mobile Communications (GSM)), digital subscriber line (DSL) networks, cable networks, telephony networks, local or wide area networks, global networks (e.g., the Internet), or any combination thereof. Accordingly, each the network devices 106 may be embodied as any type of computing device capable of facilitating wired and/or wireless network communications between the computing device 102 and the remote computing device 108 over the network 104 and.

For example, the network device 106 may be embodied as a virtual and/or physical network device, such as, without limitation, an access point, a router, a server, a network hub, a switch, a compute device, a storage device, and/or any computing device capable of performing the functions described herein. It should be appreciated that the network devices 106 may include like components to the illustrative computing device 102, described below, which are not illustrated herein to preserve clarity of the description with the understanding that the description of the like components provided below in regard to the computing device 102 apply with equal weight to the like components of the network devices 106.

The remote computing device 108 may be embodied as any type of computation or computer device capable of performing the functions described herein, including, without limitation, a computer, a smartphone, a tablet computer, a laptop computer, a notebook computer, a mobile computing device, a wearable computing device, a multiprocessor system, a server (e.g., stand-alone, rack-mounted, blade, etc.), a network appliance (e.g., physical or virtual), a web appliance, a distributed computing system, a processor-based system, and/or a consumer electronic device. In use, the remote computing device 108 is configured to communicate with the computing device 102 over the network 104 via one or more of the network devices 106. It should be appreciated that the remote computing device 108 may include like components to the illustrative computing device 102, described below, which are not illustrated herein to preserve clarity of the description with the understanding that the description of the like components provided below in regard to the computing device 102 apply with equal weight to the like components of the remote computing device 108.

The computing device 102 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 1, an illustrative computing device 102 includes a processor 110, an input/output (I/O) subsystem 112, a memory 114, a data storage device 116, communication circuitry 118, and peripheral devices 122. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 114, or portions thereof, may be incorporated in one or more processors 110 in some embodiments.

The processor 110 may be embodied as any type of processor capable of performing the functions described herein. The processor 110 may be embodied as a single or multi-core processor(s), digital signal processor, microcontroller, or other processor or processing/controlling circuit. The memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processors 110, the memory 114, and other components of the computing device 102, on a single integrated circuit chip.

The data storage device 116 may be embodied as any type of device or devices configured for short-term or long-term storage of data such as, for example, memory devices and circuits, memory cards, hard disk drives, solid-state drives, or other data storage devices. In some embodiments, the data storage device 116 may be used to store the contents of one or more trusted execution environments. When stored by the data storage device 116, the contents of the trusted execution environments may be encrypted to prevent access by unauthorized software.

The communication circuitry 118 may be embodied as any communication circuit, device, or collection thereof, capable of enabling communications between the computing device 102 and the remote computing device 108 over the network 104. The communication circuitry 118 may be configured to use any one or more communication technology (e.g., wired or wireless communications) and associated protocols (e.g., Ethernet, Bluetooth®, Wi-Fi®, WiMAX, etc.) to effect such communication. The illustrative computing device 102 additionally includes a network interface card (NIC) 120. The NIC 120 may connect the computing device 102 to a network device 106. The NIC 120 may be embodied as one or more add-in-boards, daughtercards, network interface cards, controller chips, chipsets, or other devices that may be used by the network device 106. For example, the NIC 120 may be embodied as an expansion card coupled to the I/O subsystem 112 over an expansion bus, such as PCI Express. The NIC 120 may be configured to perform hardware offload operations, such as segmentation offload, checksum offload, and/or other hardware offload operations. For example, in an embodiment wherein the NIC 120 supports segmentation offload, a payload for a network packet may be determined to be larger than a maximum segment size threshold, for example. As such, the NIC 120 may receive the payload and segment the payload into multiple segmented network packets with smaller payloads. As a result of the segmentation being offloaded to the NIC 120, the segmentation may result in increased bandwidth throughput of the communication circuitry 118 and reduced overhead of the processor 110.

The one or more peripheral devices 122 may include any type of peripheral device commonly found in a computing device, such as a hardware keyboard, input/output devices, peripheral communication devices, and/or the like, for example. Additionally or alternatively, the peripheral devices 122 may include one or more ports, such as a USB port, for example, for connecting external peripheral devices to the computing device 102.

Figure 2:
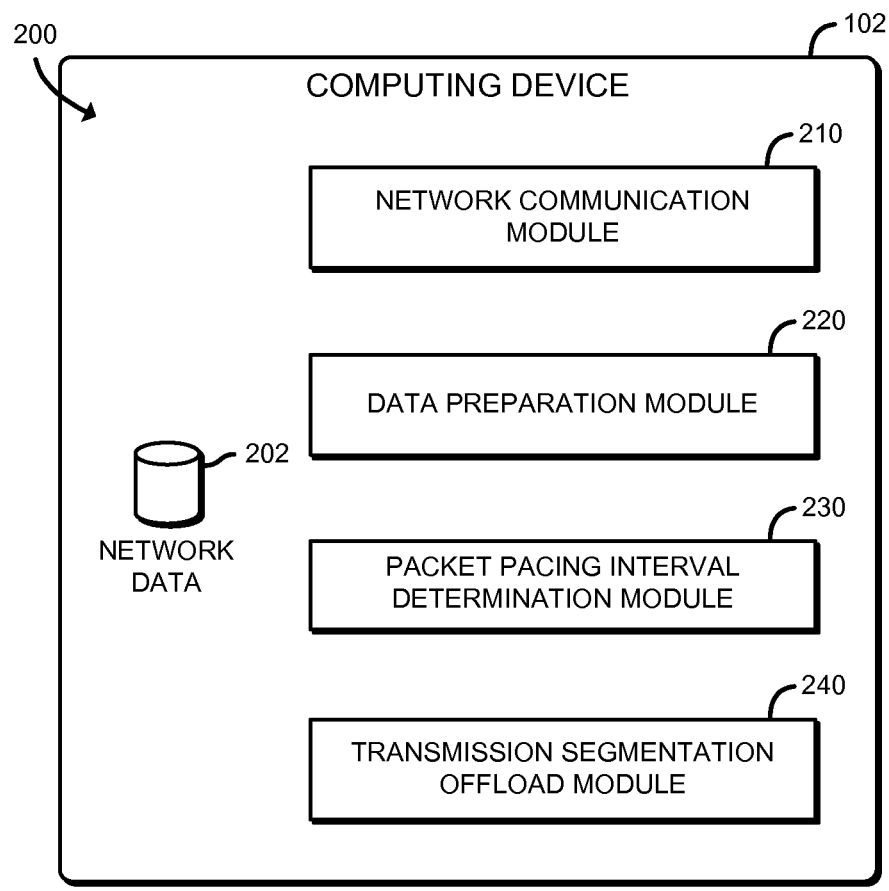
FIG. 2 is a simplified block diagram of at least one embodiment of a computing device of the system of FIG. 1.

Referring now to FIG. 2, the computing device 102 may establish an environment 200 during operation. In the illustrative environment 200, the computing device 102 includes a network communication module 210, a data preparation module 220, a packet pacing interval determination module 230, and a transmission segmentation offload module 240. The illustrative environment 200 additionally includes a network data 202 that may include network related information. The network data 202 may be accessed by one or more of the modules of the environment 200. In some embodiments, the network data 202 may include network flow information (a source port, a destination port, etc.), destination address, a round-trip-time (RTT), and/or any other network information for network packet addressing, routing, and traffic control.

The various modules of the environment 200 may be embodied as hardware, firmware, software, or a combination thereof. For example, the various modules, logic, and other components of the environment 200 may form a portion of, or otherwise be established by, the processor 110 or other hardware components of the computing device 102. As such, in some embodiments, any one or more of the modules of the environment 200 may be embodied as a circuit or collection of electrical devices (e.g., a data preparation circuit, a network packet pacing rate control circuit, a transmission segmentation offload circuit, etc.). Additionally or alternatively, in some embodiments, one or more of the illustrative modules may form a portion of another module and/or one or more of the illustrative modules and/or submodules may be embodied as a standalone or independent module.

The network communication module 210 is configured to facilitate network communications between the computing device 102 and the network devices 106. In other words, the network communication module 210 is configured to receive and process network packets received by the computing device 102 and to prepare and transmit network packets from the computing device 102. Accordingly, at least a portion of the functionality of the network communication module 210 may be performed by the communication circuitry 118, and more specifically the NIC 120. Additionally, the network communication module 210 may process received network packets by parsing the network packet header to determine network flow information (a source port, a destination port, etc.) of the received network packet and/or prepare a network packet for transmission by storing the network flow information into the header of the network packet.

The data preparation module 220 is configured to prepare data to be transmitted over the network 104 based on a network communication protocol used for data transmission. To do so, the data preparation module 220 may manage the addressing, routing, and traffic control functions of the computing device 102. Accordingly, the data preparation module 220 may be implemented based on various network protocols for data transmission, which may have different layer structures. For example, in an embodiment using a Transmission Control Protocol/Internet Protocol (TCP/IP) protocol for data transmission, the TCP/IP network stack includes several layers, each identify a particular task associated with network packet preparation and transmission. In some embodiments, the data preparation module 220 may manage preparing the data at one or more layers of the TCP/IP network stack. For example, the data preparation module 220 may prepare the data by determining various network information for the transmission of the network packet, such as a destination address, a round-trip-time (RTT), and other any number of other types of information related to the network 104 and/or the network devices 106, and incorporating such network information into a header for a network packet that includes the data (i.e., payload).

The data preparation module 220 may be further configured to determine whether a payload is too large to be transmitted as a second packet. In other words, the data preparation module 220 may determine whether a segmentation operation needs to be performed on the payload. As will be described in further detail below, the data preparation module 220 may provide instructions, or descriptors, to the transmission segmentation offload module 240. The descriptors may indicate how to break up a payload larger than a TCP receive window size into a flow of segmented network packets, each with a smaller payload than the TCP receive window size. In other words, the descriptors may include how to segment the payload. In some embodiments, the descriptors may additionally or alternatively include how to transmit the payload. In some embodiments, the descriptors may be placed in a network packet's out-of-band (e.g., a descriptor) or metadata region (i.e., a header).

The packet pacing interval determination module 230 is configured to determine a packet pacing interval. Additionally, in some embodiments, the packet pacing interval determination module 230 may be further configured to provide the packet pacing interval to the data preparation module 220 to be incorporated into the descriptors, described above. In some embodiments, the packet pacing interval determination module 230 may determine the packet pacing interval based on various factors of the data and/or network 104, such as the size, the destination, a network flow (i.e., sequence of packets to a particular destination in a particular time slot), transmission protocol, round-trip-time, etc. For example, the various network 104 factors may be determined using Link Layer Discovery Protocol (LLDP) topology discovery information, Layer 2 flow control events, 5-tuple data, and/or Explicit Congestion Notification (ECN) activity. In some embodiments, one or more functions of the packet pacing interval determination module 230 may be implemented in the TCP stack, a network controller driver, or a combination thereof.

The transmission segmentation offload module 240 is configured to perform an offloaded segmentation operation. In some embodiments, the transmission segmentation offload module 240 may perform the offloaded segmentation operation on the payload prepared by the data preparation module 220, based on descriptors provided by the data preparation module 220. As described above, a payload may be too large for transmission to a computing device to receive the payload. The determination of whether a payload is too large for transmission may be based on any number of software and/or hardware restrictions of the computing device receiving the payload. Upon determination that a payload exceeds the size threshold, the payload may be divided into segments that do not exceed the size threshold in a segmentation operation.

For example, in a TCP session, the requesting computing device (e.g., the remote computing device 108) may inform a host computing device (e.g., the computing device 102) of a TCP receive window size that corresponds to a maximum amount of data that the remote computing device 108 can receive during a TCP session. Of course, due to the amount of space available for various buffers of the remote computing device 108 continually changing while processing the received segmented network packets, the maximum allowable payload size the remote computing device 108 can support may change as available space in the buffer changes. In such embodiments, the remote computing device 108 may inform the computing device 102 of a TCP receive window size that is smaller than the network packet with the large payload. Accordingly, the transmission segmentation offload module 240 may partition a payload (i.e., data) that is too large to be received by a requesting computing device into multiple segments with smaller payloads based on the maximum allowable payload size.

Typically, the segmentation operation is performed either directly by the processor 110 or offloaded from the processor 110 to the NIC 120 (i.e., a hardware segmentation offload). Accordingly, at least a portion of the functionality of the transmission segmentation offload module 240 as described herein may be executed by or otherwise incorporated in the NIC 120 and/or a driver thereof. In some embodiments, the NIC 120 may directly accesses the memory 114, without the processor 110 intervening, commonly referred to as a direct memory access (DMA). Accordingly, one or more functions of the transmission segmentation offload module 240 may be performed using direct memory accesses.

As described above, the transmission segmentation offload module 240 may rely on the descriptors provided by the data preparation module 220 when performing the segmentation and/or transmitting the segmented packets. As also described above, the descriptors may include the packet pacing interval, which the transmission segmentation offload module 240 may use to determine a rate at which to transmit the segmented network packets. Typically, the NIC 120 transmits the segmented network packets (i.e., puts traffic onto the wire) at a fixed, maximum speed that a network packet queue or traffic class will allow. In some embodiments, the NIC 120 may not be restricted by a transfer rate limit. In other words, the segmented network packets may be transmitted with a minimum inter-packet gap, which generally results in transmission bursts of network packets designated to be received by a particular computing device.

The transmission bursts may be a result of a packet scheduler being tied up to a single queue to transmit each packet at the maximum speed for that single queue (i.e., in a burst) before being released to another queue, also to be transmitted at the maximum speed. As a result, the bursty transmissions may cause congestion at the receiving computing device, resulting in network inefficiencies, such as dropped packets, decreased throughput, etc. However, if the descriptors include the packet pacing interval, the NIC 120 may use the packet pacing interval from the descriptors to pace the transmission of packets in accordance with the packet pacing interval. Accordingly, the network packets may be transmitted at a pace that is on a per flow control. In some embodiments, this is achieved as a result of the transmission pacing causing a release of a packet scheduler to move between queues to allow for the packet pacing interval to be achieved, which may result in an interleaved mix of network packets, or packet train, to different destinations.

Figure 3:
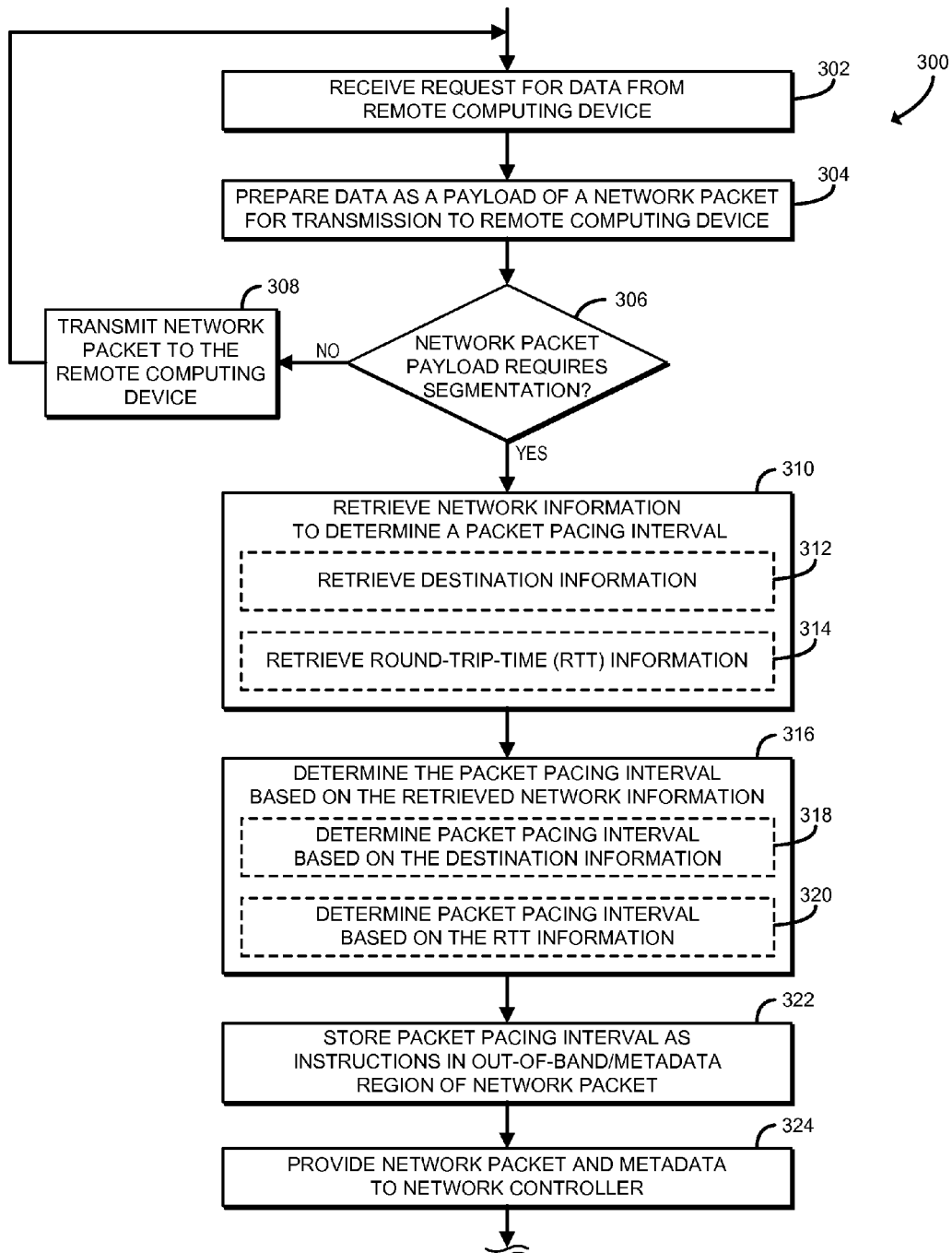
FIG. 3 is a simplified flow diagram of at least one embodiment of a method for storing a packet pacing interval into a network packet for transmission in the system of FIG. 1 that may be executed by a computing device of FIG. 2.

Referring now to FIG. 3, in use, the computing device 102 may execute a method 300 for storing a packet pacing interval into a network packet for transmission in the system 100 of FIG. 1. In some embodiments, at least of portion of the method 300 executed by the computing device 102 may be executed by the processor 110 via direct accesses to memory 114 and/or by a driver of the NIC 120 of the computing device 102. The illustrative method 300 begins at block 302, in which the computing device 102 receives a request for data from a remote computing device, such as the remote computing device 108 of FIG. 1. At block 304, the computing device 102 prepares the data for transmission to the remote computing device 108. In some embodiments, the processor 110 may prepare the data for transmission by determining information (i.e., a destination address, a destination port, a network flow, etc.) for the data, packetizing the data as a payload of a network packet, and preparing a header for the network packet with metadata that includes the determined information.

At block 306, the computing device 102 determines whether the network packet requires segmentation. If not, the method 300 advances to block 308, wherein the computing device 102 provides the network packet and descriptors to the NIC 120 of the computing device 102. If the network packet requires segmentation, the method 300 advances to block 310, wherein the computing device 102 retrieves network information corresponding to the network packet for determining a packet pacing interval. In some embodiments, at block 312, the computing device 102 may retrieve destination information that corresponds to a destination of the network packet. Additionally or alternatively, in some embodiments, at block 314, the computing device 102 may retrieve round-trip-time information corresponding to the destination for the network packet. In some embodiments, the round-trip-time may be retrieved from a TCP timestamp that may be carried in a TCP header. It should be appreciated that, in some embodiments, the round-trip-time may be calculated or measured by the computing device 102 using various methods known in the art.

At block 316, the computing device 102 determines the packet pacing interval based on the network information retrieved at block 310. In some embodiments, the packet pacing interval may be a minimum time gap between segmented network packets, or a percentage of the maximum transmission rate that results in a time gap between the segmented network packets that is greater than would otherwise be present using the maximum transmission rate. In some embodiments, at block 318, the packet pacing interval may be determined by the computing device 102 based on the destination information retrieved at block 312. Additionally or alternatively, in some embodiments, at block 320, the computing device may determine the packet pacing interval based on the round-trip-time information retrieved at block 314.

At block 322, the computing device 102 stores or otherwise places the packet pacing interval determined at block 316 as instructions, or descriptors, in an out-of-band or metadata region of the network packet. In some embodiments, the metadata region may comprise a field in a header of the network packet. It should be further appreciated that the instructions may additionally include other network information, such as segment size and other transmission information (e.g., destination IP address, destination port, etc.). At block 324, the computing device 102 provides the network packet including the instructions to a network controller, such as the NIC 120 of the computing device 102. In other words, the processor 110 of the computing device 102 offloads the segmentation operation to hardware (i.e., the network controller).

Figure 4:
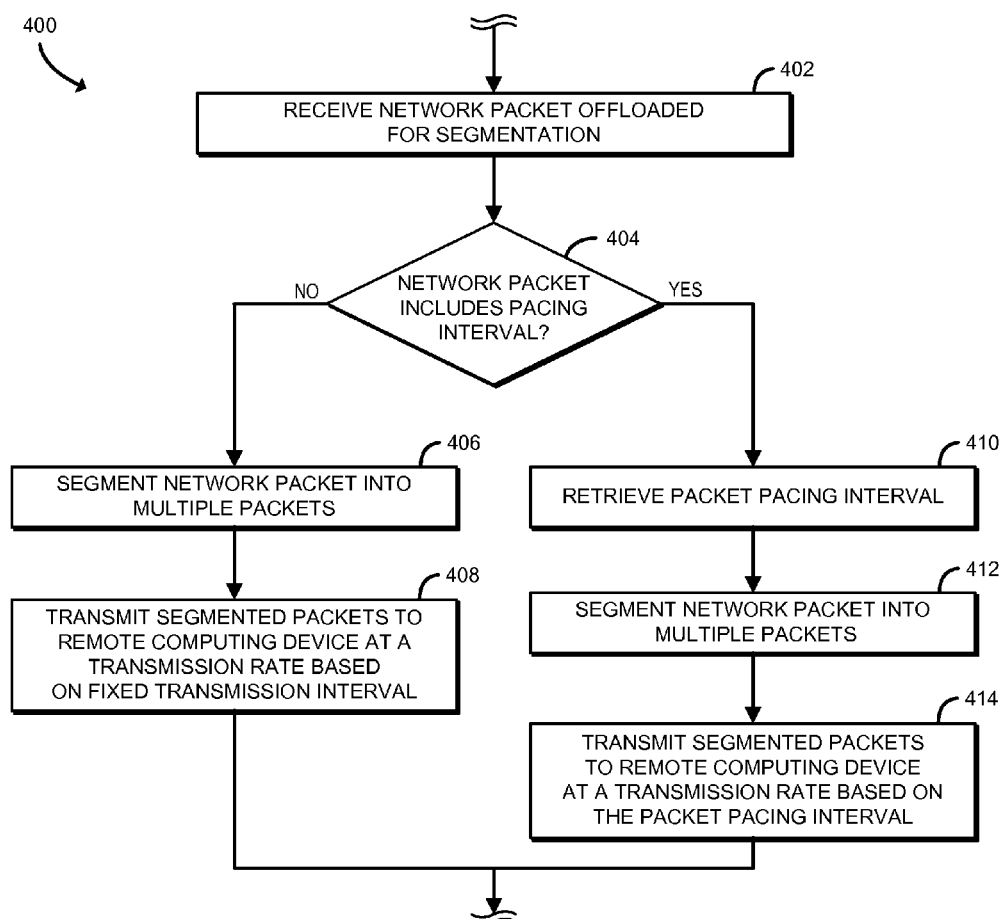
FIG. 4 is a simplified flow diagram of at least one embodiment of a method for transmitting network packets based on a pacing interval in the system of FIG. 1 that may be executed by a computing device of FIG. 2.

Referring now to FIG. 4, the computing device 102 may execute a method 400 for transmitting a packet based on a pacing interval in the system 100 of FIG. 1. In some embodiments, at least of portion of the method 400 executed by a network controller, such as the NIC 120 of the computing device 102. The illustrative method 400 begins at block 402, in which the NIC 120 receives the network packet offloaded for segmentation. At block 404, the NIC 120 determines whether the network packet includes the packet pacing interval (i.e., pacing information).

If the NIC 120 determines the network packet does not include the packet pacing interval, the method 400 advances to block 406. At block 406, the network packet is segmented into multiple packets by the NIC 120 and placed into a queue. In some embodiments, the size of the segments may be determined based on a maximum offload size provided by a driver of the NIC 120 or based on one of the descriptors provided to the NIC 120 (e.g., from the NIC 120 driver) when the network packet was offloaded to the NIC 120. At block 408, the NIC 120 transmits the segmented network packets, based on a fixed transmission interval, to the remote computing device that initially requested the data. As a result, the segmented network packets may be transmitted from the queue in bursts with minimal inter-packet gaps, as shown and described in further detail in FIG. 5.

If the NIC 120 determines the network packet includes the packet pacing interval, the method 400 advances from block 404 to block 410. At block 410, the NIC 120 retrieves the packet pacing interval. As described previously, the packet pacing interval may be included in instructions, or descriptors, for the network controller transmitted with the network packet or incorporated therein (i.e., network packet header). Accordingly, the NIC 120 may retrieve the packet pacing interval from one of the descriptors or from within the header of the network packet. At block 412, the network packet is segmented into multiple packets by the NIC 120 and placed into a queue, the size of which may be determined based on one of the descriptors provided to the NIC 120 (e.g., from the NIC 120 driver) when the network packet was offloaded to the NIC 120. At block 414, the NIC 120 transmits the segmented network packets, based on a transmission rate corresponding to the packet pacing interval, to the remote computing device that initially requested the data. As a result, the segmented network packets may be transmitted from the queue at a paced transmission rate, as shown and described in further detail in FIG. 6, which may allow the packet scheduler to move between queues.

Figure 5:
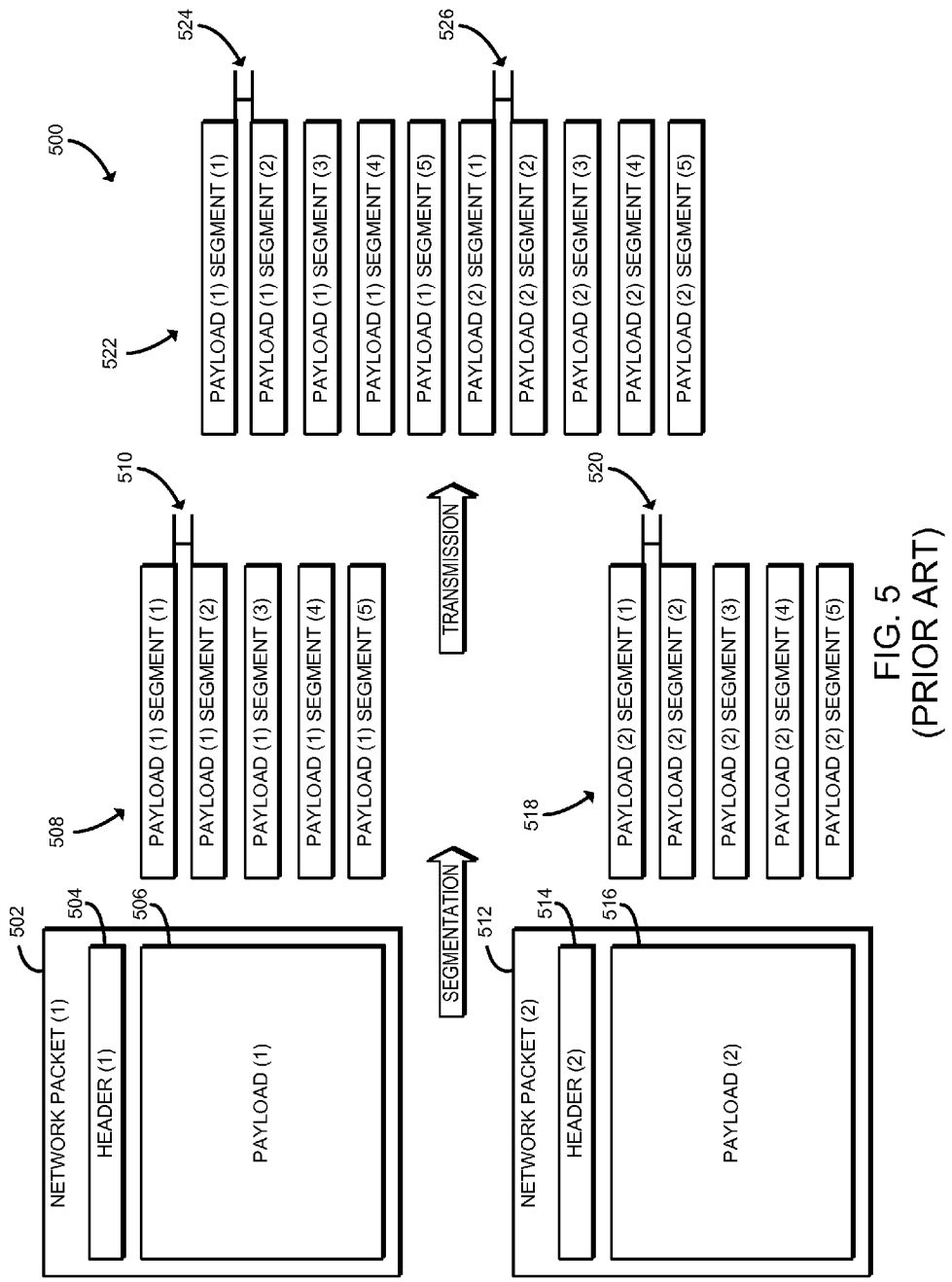
FIG. 5 is a simplified block diagram of at least one embodiment of a flow of two segmented payloads forming a packet train of network packets for transmission in the system of FIG. 1 having bursts of segmented packets ordered by destination.

Referring now to FIG. 5, a simplified block diagram of a flow 500 is shown. The flow 500 includes two segmented payloads, each having different destinations, forming a packet train of network packets that may be transmitted in the system 100 without pacing information being executed by a network controller (e.g., the NIC 120) of the computing device 102. In the illustrative flow 500, a first network packet, network packet (1), is designated as a first network packet 502, and a second network packet, network packet (2), is designated as a second network packet 512. The first and second network packets 502, 512 each include a header and a payload. The first network packet header and payload, header (1) and payload (1), are designated as a first header 504 and a first payload 506, respectively. Similarly, the second network packet header and payload, header (2) and payload (2), are designated as a second header 514 and a second payload 516, respectively. Each of the first and second payloads 506, 516 are shown as single payloads that are sufficiently large in size to require segmenting. In the illustrative flow 500, each of the first and second payloads 506, 516 are segmented into queues 508, 518 of segmented payloads of five segments by the NIC 120 based a maximum segment length that may be sent to the NIC 120 during the offload request in the form of instructions, or descriptors, for example. It should be appreciated that while the payload segments only show a payload designation (i.e., payload (N) segment (n)), each of the payload segments may be network packets including the shown designated payload and appropriate headers.

Each of the segmented payloads of the queue 508 of the first payload 506 includes an inter-packet gap, one of which is shown designated as inter-packet gap 510, and each of the segmented payloads of the queue 518 of the second payload 516 includes an inter-packet gap, one of which is shown designated as inter-packet gap 520, according to a transmission rate. Each of the transmission rates is set based on the maximum transmission rate, typically on a per-queue or per-traffic class limit. As such, the transmission rates for the two network packets 502, 512 with different destinations may be grouped using a single rate that cannot be adjusted by the networking stack. In other words, the transmission rate that produces the inter-packet gap 510 is equal to the transmission rate that produces the inter-packet gap 520. As a result, a packet train 522 is produced that includes the segmented payloads of the queues 508, 518 in sequential order by destination. Accordingly, an inter-packet gap 524 is equal to the inter-packet gaps 510, 520 and an inter-packet gap 526 is also equal to the inter-packet gaps 510, 520. Transmission of the segmented payloads of the resulting packet train 522 will be transmitted with minimal inter-packet gaps, which may result in network inefficiencies, such as dropped packets and/or decreased throughput at the receiving computing devices (e.g., the network devices 106 and/or the remote computing device 108).

Figure 6:
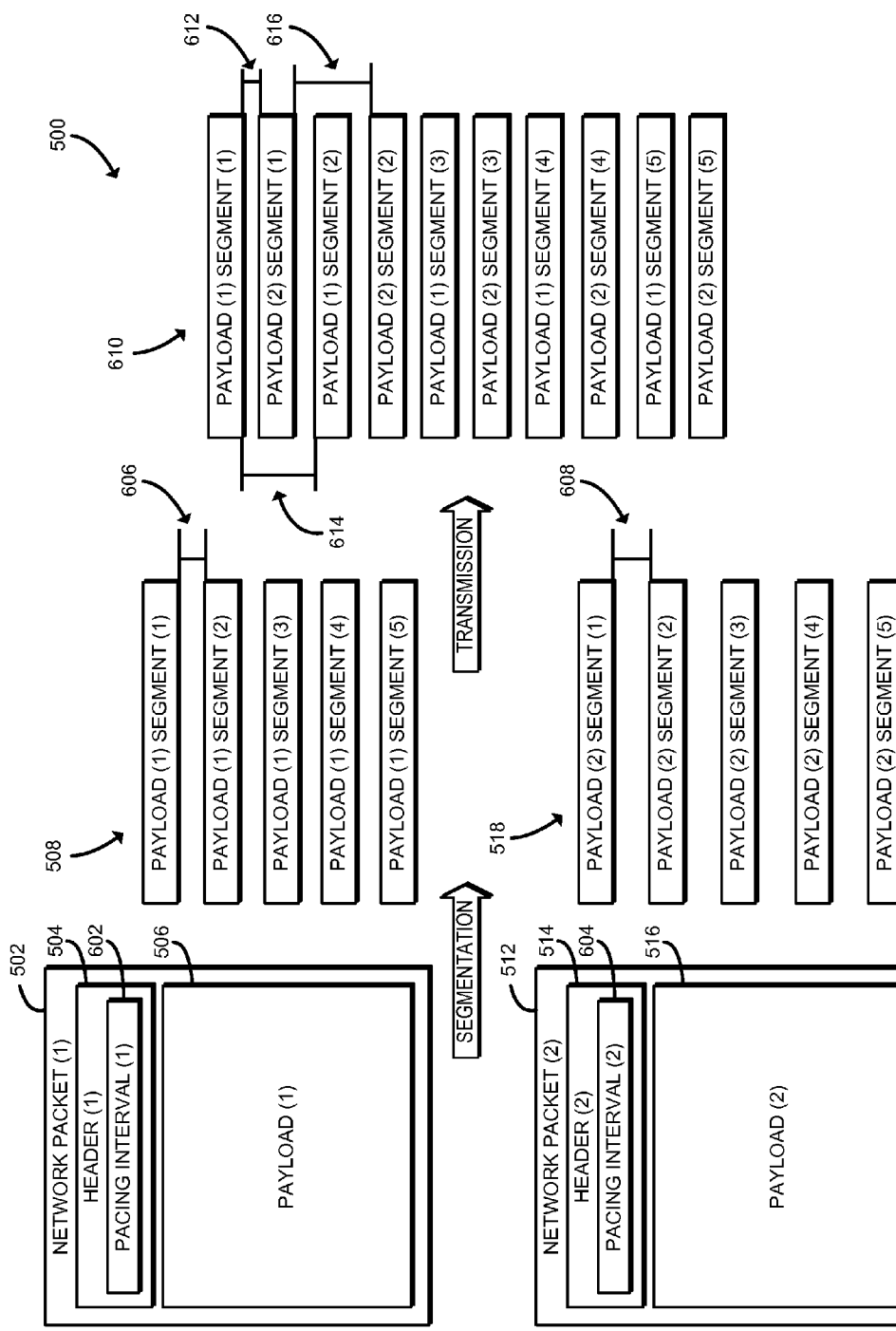
FIG. 6 is a simplified block diagram of at least one embodiment of a flow of two segmented payloads forming a packet train of network packets for transmission in the system of FIG. 1 having interleaved segmented packets ordered by alternating destinations.

Referring now to FIG. 6, a simplified block diagram of a flow 600 is shown. The flow 600 includes two segmented payloads, each having different destinations, forming a packet train of network packets that may be transmitted in the system 100 with pacing information being executed by a network controller (e.g., the NIC 120) of the computing device 102. The illustrative flow 600 includes the network packets 502, 512 of FIG. 5; however, each of the headers 504, 514 includes the first and second pacing intervals 602, 604 that the NIC 120 may use to transmit the payload segments of the queues 508, 518. It should be appreciated that, in some embodiments, the first and second pacing intervals 602, 604 may be provided to the NIC 120 in a supplemental set of offload instructions, or transmit descriptors, with each network packet 502, 514 instead of being stored or placed in the headers 504, 514. As described above, the first and second pacing intervals 602, 604 indicate a minimum time, or intra-packet gap, between the transmission of each the segmented payloads for each of the queues 508, 518. In some embodiments, the first and second pacing intervals 602, 604 may additionally include instructions regarding how many network packets for a destination, or queue, may be sent before initiating the minimum time requirement. In such embodiments, the additional instructions may delay a queue's traffic by sending from another queue, or pausing transmission if there are no other queues for transmission.

Similar to FIG. 5, each of the segmented payloads of the queue 508 of the first payload 506 includes an inter-packet gap 606 and each of the segmented payloads of the queue 518 of the second payload 516 includes an inter-packet gap 608. While the segmented payloads of the queues 508, 518 are the same in FIG. 6 as FIG. 5, the inter-packet gap 606 is determined according to a first transmission rate based on the first pacing interval 602 and the inter-packet gap 608 is determined according to a second transmission rate based on the second pacing interval 604. Accordingly, either or both of the inter-packet gaps 606, 608 may be greater than the inter-packet gaps 510, 520 of FIG. 5. In other words, the inter-packet gaps 606, 608 may be larger than inter-packet gaps resulting from using the maximum transmission rate that is typically used by the NIC 120 in a hardware segmentation offload. As a result, a packet train 610 is produced that includes the segmented payloads of the queues 508, 518; however, unlike FIG. 5, the packet train 610 is comprised of interleaved segmented payloads of the queues 508, 518.

While each segmented payload may be transmitted using a transmission rate at or near the maximum transmission rate, resulting in an inter-packet gap 612 that may be equivalent to the inter-packet gaps 510, 520, the inter-packet gaps for each payload segment of the queues 508, 518 is increased. For example, an inter-packet gap 614 between the first and second payload segments of the first payload 506 exceeds the inter-packet gap 606 based on the first pacing interval 602. Similarly, an inter-packet gap 616 between the first and second payload segments of the second payload 516 exceeds the inter-packet gap 608 based on the second pacing interval 604. Due to the larger inter-packet gaps 614, 616 (i.e., in comparison the inter-packet gaps 524, 526 of FIG. 5) in transmission of the network packets of the packet train 610, the receiving computing devices (e.g., the network devices 106 and/or the remote computing device 108) may have additional time to process the received network packets and as such, reduce the likelihood of network inefficiencies that may result from congestion.

EXAMPLES

Illustrative examples of the technologies disclosed herein are provided below. An embodiment of the technologies may include any one or more, and any combination of, the examples described below.

Example 1 includes a computing device to pace transmission of offloaded network packet segments, the computing device comprising a packet pacing interval determination module to determine a packet pacing interval; a transmission segmentation offload module to segment the payload into a plurality of network packet segments; and a network communication module to determine whether the packet pacing interval has been received at the network communication module and to transmit the plurality of network packet segments to the remote computing device at a transmission rate based on the packet pacing interval in response to a determination that the packet pacing interval was received at the network communication module.

Example 2 includes the subject matter of Example 1, and further comprising a data preparation module to prepare a payload of a network packet for transmission to a remote computing device and determine whether a size of the payload of the network packet is greater than a maximum allowable payload size, wherein to determine the packet pacing interval comprises to determine the packet pacing interval in response to a determination that the size of the payload is greater than the maximum allowable payload size, and wherein to segment the payload into a plurality of network packet segments comprises to segment the payload into a plurality of network packet segments in response to the determination that the size of the payload is greater than the maximum allowable payload size.

Example 3 includes the subject matter of Examples 1 and 2, and wherein the packet pacing interval determination module determines the packet pacing interval, at least in part, based on a destination of the payload.

Example 4 includes the subject matter of any of Examples 1-3, and wherein the packet pacing interval determination module determines the packet pacing interval, at least in part, based on a round-trip-time of the payload.

Example 5 includes the subject matter of any of Examples 1-4, and wherein the packet pacing interval determination module determines the packet pacing interval, at least in part, based on a network flow of the payload.

Example 6 includes the subject matter of any of Examples 1-5, and wherein the packet pacing interval determination module is further to provide the packet pacing interval to the network communication module as a descriptor.

Example 7 includes the subject matter of any of Examples 1-6, and wherein the packet pacing interval determination module is further to place the packet pacing interval in a header of the network packet.

Example 8 includes the subject matter of any of Examples 1-7, and wherein the packet pacing interval determination module is further to place the packet pacing interval in an out-of-band region of the network packet.

Example 9 includes the subject matter of any of Examples 1-8, and wherein the network communication module is to transmit the plurality of network packet segments to the remote computing device at a transmission rate based on a maximum transmission rate in response to a determination that the packet pacing interval was not received.

Example 10 includes the subject matter of any of Examples 1-9, and wherein the data preparation module is further to provide network packet segment size information to the transmission segmentation offload module, and wherein the transmission segmentation offload module segments the payload into the plurality of network packet segments based on the network packet segment size information.

Example 11 includes the subject matter of any of Examples 1-10, and wherein the network communication module transmits the plurality of network packet segments to the remote computing device from a queue.

Example 12 includes a computing device to pace transmission of hardware offloaded network packet segments, the computing device comprising a processor to prepare a payload of a network packet for transmission to a remote computing device and determine whether a size of the payload of the network packet is greater than a maximum allowable payload size; a network interface card to segment the payload into a plurality of network packet segments in response to a determination that the size of the payload is greater than the maximum allowable payload size; and a driver of the network interface card to determine a packet pacing interval in response to the determination that the size of the payload is greater than the maximum allowable payload size, wherein the network interface card is further to determine whether the packet pacing interval has been received at the network controller and to transmit the plurality of network packet segments to the remote computing device at a transmission rate based on the packet pacing interval in response to a determination that the packet pacing interval was received.

Example 13 includes the subject matter of Example 12, and further including a memory to provide direct access to the network interface card to segment the payload into the plurality of network packet segments.

Example 14 includes the subject matter of any of Examples 12 and 13, and wherein the driver determines the packet pacing interval, at least in part, based on a destination of the payload.

Example 15 includes the subject matter of any of Examples 12-14, and wherein the driver determines the packet pacing interval, at least in part, based on a round-trip-time of the payload.

Example 16 includes the subject matter of any of Examples 12-15, and wherein the driver determines the packet pacing interval, at least in part, based on a destination address of the payload.

Example 17 includes the subject matter of any of Examples 12-16, and wherein the driver determines the packet pacing interval, at least in part, based on a network flow of the payload.

Example 18 includes the subject matter of any of Examples 12-17, and wherein the driver is further to provide the packet pacing interval to the network interface card as a descriptor.

Example 19 includes the subject matter of any of Examples 12-18, and wherein the driver is further to place the packet pacing interval in a header of the network packet.

Example 20 includes the subject matter of any of Examples 12-19, and wherein the driver is further to place the packet pacing interval in an out-of-band region of the network packet.

Example 21 includes the subject matter of any of Examples 12-20, and wherein the network interface card is to transmit the plurality of network packet segments to the remote computing device at a transmission rate based on a maximum transmission rate in response to a determination that the packet pacing interval was not received.

Example 22 includes the subject matter of any of Examples 12-21, and wherein the driver is further to provide network packet segment size information to the network interface card, and wherein the network interface card segments the payload into the plurality of network packet segments based on the network packet segment size information.

Example 23 includes the subject matter of any of Examples 12-22, and wherein the network interface card transmits the plurality of network packet segments to the remote computing device from a queue.

Example 24 includes a method for pacing transmission of network packets to a remote computing device, the method comprising preparing, at a computing device, a payload of a network packet for transmission to the remote computing device determining, at the computing device, whether a size of the payload of the network packet is greater than a maximum allowable payload size; determining, at the computing device, a packet pacing interval in response to a determination that the size of the payload is greater than the maximum allowable payload size; segmenting, at a network controller of the computing device, the payload into a plurality of network packet segments in response to the determination that the size of the payload is greater than the maximum allowable payload size; determining, at the computing device, whether the packet pacing interval has been received at the network controller; and transmitting, at the network controller of the computing device, the plurality of network packet segments to the remote computing device at a transmission rate based on the packet pacing interval in response to a determination that the packet pacing interval was received.

Example 25 includes the subject matter of Example 24, and wherein determining the packet pacing interval is based at least in part on a destination of the payload.

Example 26 includes the subject matter of any of Examples 24 and 25, and wherein determining the packet pacing interval is based at least in part on a round-trip-time of the payload.

Example 27 includes the subject matter of any of Examples 24-26, and wherein determining the packet pacing interval is based at least in part on a destination address of the payload.

Example 28 includes the subject matter of any of Examples 24-27, and wherein determining the packet pacing interval is based at least in part on a network flow of the payload.

Example 29 includes the subject matter of any of Examples 24-28, and further including receiving the packet pacing interval at the network controller as a descriptor.

Example 30 includes the subject matter of any of Examples 24-29, and further including storing the packet pacing interval in a header of the network packet.

Example 31 includes the subject matter of any of Examples 24-30, and further including storing the packet pacing interval in an out-of-band region of the network packet.

Example 32 includes the subject matter of any of Examples 24-31, and further including transmitting the plurality of network packet segments to the remote computing device at a transmission rate based on a maximum transmission rate in response to a determination that the packet pacing interval was not received.

Example 33 includes the subject matter of any of Examples 24-32, and wherein segmenting the payload into the plurality of network packet segments comprises segmenting the payload into the plurality of network packet segments based on network packet segment size information.

Example 34 includes the subject matter of any of Examples 24-33, and wherein transmitting the plurality of network packet segments to the remote computing device comprises transmitting the plurality of network packet segments to the remote computing device from a queue.

Example 35 includes a method for pacing transmission of hardware offloaded network packet segments, the method comprising preparing, by a processor of a computing device, a payload of a network packet for transmission to a remote computing device determining, by the processor of the computing device, whether a size of the payload of the network packet is greater than a maximum allowable payload size; segmenting, by a network interface card of the computing device, the payload into a plurality of network packet segments in response to a determination that the size of the payload is greater than the maximum allowable payload size; and determining, by a driver of the network interface card, a packet pacing interval in response to the determination that the size of the payload is greater than the maximum allowable payload size, detecting, by the network interface card, whether the packet pacing interval has been received at the network controller; transmitting, by the network interface card, the plurality of network packet segments to the remote computing device at a transmission rate based on the packet pacing interval in response to a detection that the packet pacing interval was received.

Example 36 includes the subject matter of Example 35, and further comprising providing, by a memory of the computing device, direct access to the network interface card in which to segment the payload into the plurality of network packet segments.

Example 37 includes the subject matter of any of Examples 35 and 36, and wherein determining the packet pacing interval comprises determining the packet pacing interval, at least in part, based on a destination of the payload.

Example 38 includes the subject matter of any of Examples 35-37, and wherein determining the packet pacing interval comprises determining the packet pacing interval, at least in part, based on a round-trip-time of the payload.

Example 39 includes the subject matter of any of Examples 35-38, and wherein determining the packet pacing interval comprises determining the packet pacing interval, at least in part, based on a destination address of the payload.

Example 40 includes the subject matter of any of Examples 35-39, and wherein determining the packet pacing interval comprises determining the packet pacing interval, at least in part, based on a network flow of the payload.

Example 41 includes the subject matter of any of Examples 35-40, and further including providing, by the driver, the packet pacing interval to the network interface card as a descriptor.

Example 42 includes the subject matter of any of Examples 35-41, and further including storing, by the driver, the packet pacing interval in a header of the network packet.

Example 43 includes the subject matter of any of Examples 35-42, and further including storing, by the driver, the packet pacing interval in an out-of-band region of the network packet.

Example 44 includes the subject matter of any of Examples 35-43, and further including transmitting, by the network interface card, the plurality of network packet segments to the remote computing device at a transmission rate based on a maximum transmission rate in response to a determination that the packet pacing interval was not received.

Example 45 includes the subject matter of any of Examples 35-44, and further including providing, by the driver, network packet segment size information to the network interface card, wherein the network interface card segments the payload into the plurality of network packet segments based on the network packet segment size information.

Example 46 includes the subject matter of any of Examples 35-45, and further including transmitting, by the network interface card, the plurality of network packet segments to the remote computing device from a queue.

Example 47 includes a computing device comprising a processor; and a memory having stored therein a plurality of instructions that when executed by the processor cause the computing device to perform the method of any of Examples 24-34.

Example 48 includes one or more machine readable storage media comprising a plurality of instructions stored thereon that in response to being executed result in a computing device performing the method of any of Examples 24-34.

Example 49 includes a computing device comprising a processor; and a memory having stored therein a plurality of instructions that when executed by the processor cause the computing device to perform the method of any of Examples 35-46.

Example 50 includes one or more machine readable storage media comprising a plurality of instructions stored thereon that in response to being executed result in a computing device performing the method of any of Examples 35-46. 51.

Example 51 includes a computing device for pacing transmission of network packets to a remote computing device, the computing device comprising means for preparing a payload of a network packet for transmission to the remote computing device; means for determining whether a size of the payload of the network packet is greater than a maximum allowable payload size; means for determining a packet pacing interval in response to a determination that the size of the payload is greater than the maximum allowable payload size; means for segmenting, at a network controller of the computing device, the payload into a plurality of network packet segments in response to the determination that the size of the payload is greater than the maximum allowable payload size; means for determining whether the packet pacing interval has been received at the network controller; and means for transmitting, at the network controller of the computing device, the plurality of network packet segments to the remote computing device at a transmission rate based on the packet pacing interval in response to a determination that the packet pacing interval was received.

Example 52 includes the subject matter of Example 51, and wherein the means for determining the packet pacing interval comprises means for determining the packet pacing interval based at least in part on a destination of the payload.

Example 53 includes the subject matter of Example 51 and 52, and wherein the means for determining the packet pacing interval comprises means for determining the packet pacing interval based at least in part on a round-trip-time of the payload.

Example 54 includes the subject matter of Examples 51-53, and wherein the means for determining the packet pacing interval comprises means for determining the packet pacing interval based at least in part on a destination address of the payload.

Example 55 includes the subject matter of Examples 51-54, and the means for determining the packet pacing interval comprises means for determining the packet pacing interval based at least in part on a network flow of the payload.

Example 56 includes the subject matter of Examples 51-55, and further comprising means for receiving the packet pacing interval at the network controller as a descriptor.

Example 57 includes the subject matter of Examples 51-56, and further comprising means for storing the packet pacing interval in a header of the network packet.

Example 58 includes the subject matter of Examples 51-57, and further comprising means for storing the packet pacing interval in an out-of-band region of the network packet.

Example 59 includes the subject matter of Examples 51-58, and further comprising means for transmitting the plurality of network packet segments to the remote computing device at a transmission rate based on a maximum transmission rate in response to a determination that the packet pacing interval was not received.

Example 60 includes the subject matter of Examples 51-59, and wherein the means for segmenting the payload into the plurality of network packet segments comprises means for segmenting the payload into the plurality of network packet segments based on network packet segment size information.

Example 61 includes the subject matter of Examples 51-60, and wherein the means for transmitting the plurality of network packet segments to the remote computing device comprises means for transmitting the plurality of network packet segments to the remote computing device from a queue.

Example 62 includes a computing device for pacing transmission of offloaded network packet segments, the computing device comprising means for preparing, by a processor of a computing device, a payload of a network packet for transmission to a remote computing device means for determining, by the processor of the computing device, whether a size of the payload of the network packet is greater than a maximum allowable payload size; means for segmenting, by a network interface card of the computing device, the payload into a plurality of network packet segments in response to a determination that the size of the payload is greater than the maximum allowable payload size; and means for determining, by a driver of the network interface card, a packet pacing interval in response to the determination that the size of the payload is greater than the maximum allowable payload size, means for detecting, by the network interface card, whether the packet pacing interval has been received at the network controller; means for transmitting, by the network interface card, the plurality of network packet segments to the remote computing device at a transmission rate based on the packet pacing interval in response to a detection that the packet pacing interval was received.

Example 63 includes the subject matter of Example 62, and further comprising means for providing, by a memory of the computing device, direct access to the network interface card in which to segment the payload into the plurality of network packet segments.

Example 64 includes the subject matter of Example 62 and 63, and wherein the means for determining the packet pacing interval comprises means for determining the packet pacing interval, at least in part, based on a destination of the payload.

Example 65 includes the subject matter of Example 62-64, and wherein the means for determining the packet pacing interval comprises means for determining the packet pacing interval, at least in part, based on a round-trip-time of the payload.

Example 66 includes the subject matter of Example 62-65, and wherein the means for determining the packet pacing interval comprises means for determining the packet pacing interval, at least in part, based on a destination address of the payload.

Example 67 includes the subject matter of Example 62-66, and wherein the means for determining the packet pacing interval comprises means for determining the packet pacing interval, at least in part, based on a network flow of the payload.

Example 68 includes the subject matter of Example 62-67, and further comprising means for providing, by the driver, the packet pacing interval to the network interface card as a descriptor.

Example 69 includes the subject matter of Example 62-68, and further comprising means for storing, by the driver, the packet pacing interval in a header of the network packet.

Example 70 includes the subject matter of Example 62-69, and further comprising means for storing, by the driver, the packet pacing interval in an out-of-band region of the network packet.

Example 71 includes the subject matter of Example 62-70, and further comprising means for transmitting, by the network interface card, the plurality of network packet segments to the remote computing device at a transmission rate based on a maximum transmission rate in response to a determination that the packet pacing interval was not received.

Example 72 includes the subject matter of Example 62-71, and further comprising means for providing, by the driver, network packet segment size information to the network interface card, wherein the network interface card segments the payload into the plurality of network packet segments based on the network packet segment size information.

Example 73 includes the subject matter of Example 62-72, and further comprising means for transmitting, by the network interface card, the plurality of network packet segments to the remote computing device from a queue.

The invention claimed is:

1. A computing device to pace transmission of offloaded network packet segments, the computing device comprising:
   a data preparation module to prepare the payload of the network packet for transmission to a remote computing device and determine whether a size of the payload of the network packet is greater than a maximum allowable payload size;
   a packet pacing interval determination module to determine a packet pacing interval in response to a determination that the size of the payload is greater than the maximum allowable payload size;
   a transmission segmentation offload module to segment a payload of a network packet into a plurality of network packet segments in response to the determination that the size of the payload is greater than the maximum allowable payload size; and
   a network communication module to determine whether the packet pacing interval has been received at the network communication module and to transmit the plurality of network packet segments to the remote computing device at a transmission rate based on the packet pacing interval in response to a determination that the packet pacing interval was received at the network communication module.

2. The computing device of claim 1, wherein the packet pacing interval determination module determines the packet pacing interval, at least in part, based on a destination of the payload.

3. The computing device of claim 1, wherein the packet pacing interval determination module determines the packet pacing interval, at least in part, based on a round-trip-time of the payload.

4. The computing device of claim 1, wherein the packet pacing interval determination module determines the packet pacing interval, at least in part, based on a network flow of the payload.

5. The computing device of claim 1, wherein the packet pacing interval determination module is further to provide the packet pacing interval to the network communication module as a descriptor.

6. The computing device of claim 1, wherein the packet pacing interval determination module is further to place the packet pacing interval in a header of the network packet.

7. The computing device of claim 1, wherein the packet pacing interval determination module is further to place the packet pacing interval in an out-of-band region of the network packet.

8. The computing device of claim 1, wherein the network communication module is to transmit the plurality of network packet segments to the remote computing device at a transmission rate based on a maximum transmission rate in response to a determination that the packet pacing interval was not received.

9. The computing device of claim 1, wherein the data preparation module is further to provide network packet segment size information to the transmission segmentation offload module, and
   wherein the transmission segmentation offload module segments the payload into the plurality of network packet segments based on the network packet segment size information.

10. The computing device of claim 1, wherein the network communication module transmits the plurality of network packet segments to the remote computing device from a queue.

11. One or more non-transitory, machine-readable storage media comprising a plurality of instructions stored thereon that, in response to being executed cause a computing device to:
    prepare a payload of a network packet for transmission to the remote computing device;
    determine whether a size of the payload of the network packet is greater than a maximum allowable payload size;
    determine a packet pacing interval in response to a determination that the size of the payload is greater than the maximum allowable payload size;
    segment, at a network controller of the computing device, the payload into a plurality of network packet segments in response to the determination that the size of the payload is greater than the maximum allowable payload size;
    determine whether the packet pacing interval has been received at the network controller; and
    transmit, at the network controller of the computing device, the plurality of network packet segments to the remote computing device at a transmission rate based on the packet pacing interval in response to a determination that the packet pacing interval was received.

12. The one or more non-transitory, machine-readable storage media of claim 11, wherein to determine the packet pacing interval comprises to determine the packet interval based at least in part on at least one of a destination of the payload, a round-trip-time of the payload, or a network flow of the payload.

13. The one or more non-transitory, machine-readable storage media of claim 11, wherein the plurality of instructions further cause the mobile computing device to:
    receive the packet pacing interval at the network controller as a descriptor.

14. The one or more non-transitory, machine-readable storage media of claim 11, wherein the plurality of instructions further cause the mobile computing device to:
    place the packet pacing interval in at least one of a header of the network packet or an out-of-band region of the network packet.

15. The one or more non-transitory, machine-readable storage media of claim 11, wherein the plurality of instructions further cause the mobile computing device to:
    transmit the plurality of network packet segments to the remote computing device at a transmission rate based on a maximum transmission rate in response to a determination that the packet pacing interval was not received.

16. The one or more non-transitory, machine-readable storage media of claim 11, wherein to segment the payload into the plurality of network packet segments comprises to segment the payload into the plurality of network packet segments based on network packet segment size information.

17. The one or more non-transitory, machine-readable storage media of claim 11, wherein to transmit the plurality of network packet segments to the remote computing device comprises to transmit the plurality of network packet segments to the remote computing device from a queue.

18. A method for pacing transmission of network packets to a remote computing device, the method comprising:
preparing, at a computing device, a payload of a network packet for transmission to the remote computing device;
determining, at the computing device, whether a size of the payload of the network packet is greater than a maximum allowable payload size;
determining, at the computing device, a packet pacing interval in response to a determination that the size of the payload is greater than the maximum allowable payload size;
segmenting, at a network controller of the computing device, the payload into a plurality of network packet segments in response to the determination that the size of the payload is greater than the maximum allowable payload size;
determining, at the computing device, whether the packet pacing interval has been received at the network controller; and
transmitting, at the network controller of the computing device, the plurality of network packet segments to the remote computing device at a transmission rate based on the packet pacing interval in response to a determination that the packet pacing interval was received.

19. The method of claim 18, wherein determining the packet pacing interval comprises determining the packet pacing interval based at least in part on at least one of a destination of the payload, a round-trip-time of the payload, or a network flow of the payload.

20. The method of claim 18, further comprising:
receiving the packet pacing interval at the network controller as a descriptor.

21. The method of claim 18, further comprising:
storing the packet pacing interval in at least one of a header of the network packet or an out-of-band region of the network packet.

22. The method of claim 18, further comprising:
transmitting the plurality of network packet segments to the remote computing device at a transmission rate based on a maximum transmission rate in response to a determination that the packet pacing interval was not received.

23. The method of claim 18, wherein segmenting the payload into the plurality of network packet segments comprises segmenting the payload into the plurality of network packet segments based on network packet segment size information.

24. The method of claim 18, wherein transmitting the plurality of network packet segments to the remote computing device comprises transmitting the plurality of network packet segments to the remote computing device from a queue.

25. A computing device to pace transmission of offloaded network packet segments, the computing device comprising:
a processor to prepare a payload of a network packet for transmission to a remote computing device and determine whether a size of the payload of the network packet is greater than a maximum allowable payload size;
a network interface card to segment the payload into a plurality of network packet segments in response to a determination that the size of the payload is greater than the maximum allowable payload size; and
a driver of the network interface card to determine a packet pacing interval in response to the determination that the size of the payload is greater than the maximum allowable payload size,
wherein the network interface card is further to determine whether the packet pacing interval has been received and to transmit the plurality of network packet segments to the remote computing device at a transmission rate based on the packet pacing interval in response to a determination that the packet pacing interval was received.

26. The computing device of claim 25, further comprising:
a memory to provide direct access to the network interface card to segment the payload into the plurality of network packet segments.

27. The computing device of claim 25, wherein the driver determines the packet pacing interval, at least in part, based on at least one of a destination of the payload, a round-trip-time of the payload, or a network flow of the payload.

* * * * *